US006696820B2

(12) United States Patent
Peter

(10) Patent No.: US 6,696,820 B2
(45) Date of Patent: Feb. 24, 2004

(54) ALTERNATING CURRENT GENERATOR FIELD REGULATION CONTROL

(75) Inventor: David Allan Peter, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 136 days.

(21) Appl. No.: 10/011,448

(22) Filed: Oct. 30, 2001

(65) Prior Publication Data
US 2003/0080715 A1 May 1, 2003

(51) Int. Cl.[7] .................................................. H02P 9/00
(52) U.S. Cl. .............................. 322/24; 322/26; 322/28
(58) Field of Search ............................... 322/24, 26, 28

(56) References Cited

U.S. PATENT DOCUMENTS 5,982,154 A * 11/1999 Kanazawa ................... 322/29

* cited by examiner

Primary Examiner—Dang Le
Assistant Examiner—Iraj A. Mohandesi
(74) Attorney, Agent, or Firm—Jimmy L. Funke

(57) ABSTRACT

A circuit configuration for controlling the field current of an alternating current generator in a vehicle electrical generator system includes a digital to analog converter for converting a digital command signal to an analog voltage. A first comparator compares the system field current with the converted analog voltage. A switched component, operatively connected to a power switch, is switchable in response to the comparator output. A frequency generator, operatively connected to the switched component, provides timed pulses to periodically tell the switched component to turn on the power switch.

3 Claims, 1 Drawing Sheet

ALTERNATING CURRENT GENERATOR FIELD REGULATION CONTROL

TECHNICAL FIELD

This invention relates to alternating current (AC) generator regulators and more particularly to a field regulation control and method utilizing a fixed frequency "turn on" and a set point "turn off".

BACKGROUND OF THE INVENTION

It is known in the art relating to alternating current (AC) generator regulators to use a pulse width modulation (PWM) scheme where the PWM is commanded by a non-linear algorithm to regulate the generator field. The algorithm is non-linear for load response reasons and to compensate for the non-linear response of the field and hence the generator. Non-linear here references the fact that a fixed current change (example 10 amps) will create a different transient depending on whether the generator is near full load or is near no load. A free wheeling diode is typically used to clamp the inductive energy of the field. This results in a faster or slower decay in the freewheel mode than the field charge mode depending on whether the field is at high or low current respectively. The average voltage applied to the field is proportional to B+, which can cause some instabilities because increasing B+ causes field voltage to increase which in turn increases B+.

Conventional regulators also have an overcurrent circuit which shuts down the output device for a finite period of time. This overcurrent circuit has caused some problems when the field resistance gets low which occurs when the generator is cold resulting in reduced generator output until the overcurrent condition goes away.

SUMMARY OF THE INVENTION

An object of the present invention is to reduce alternating current (AC) generator field regulation circuit complexity and improve generator regulator performance.

Another object of the invention is to eliminate the need for a non-linear control to compensate for the varying response at different loads to a fixed load step. Still another object is to eliminate the over current problem in conventional designs.

Yet another object of the invention is to eliminate the need for overvoltage protection.

Accordingly, a field regulation control and method are provided which uses current through the switch. A circuit configuration for controlling the field current of an alternating current generator in a vehicle electrical generator system includes a digital to analog converter for converting a digital command signal to an analog voltage. A first comparator compares the system field current with the converted analog voltage. A switched component, operatively connected to a power switch, is switchable in response to the comparator output. A frequency generator, operatively connected to the switched component, provides timed pulses to periodically tell the switched component to turn on the power switch.

The circuit configuration further includes a second comparator for comparing a sensed voltage, where voltage regulation is required, with a reference voltage. An up/down counter converts the over/under signal from the comparator to the digital command signal. A frequency generator increments the up/down counter. A supervisory control circuit is operatively connected to the up/down counter. Generator field and phase signals, and an ignition input signal are used to power up and power down the generator.

A method for controlling the field current of an alternating current generator in a vehicle electrical generator system includes:

converting a digital command signal to an analog voltage;

comparing the system field current with the converted analog voltage;

switching off a power switch in response to the comparator output; and generating timed pulses to periodically tell the switched component to turn on the power switch.

The method further includes the steps of:

comparing a sensed voltage, where voltage regulation is required, with a reference voltage;

converting the over/under signal from the comparator to the digital command signal; and incrementing the digital command signal.

These and other features and advantages of the invention will be more fully understood from the following description of certain specific embodiments of the invention taken together with the accompanying drawings.

DESCRIPTION OF THE PREFERRED EMBODIMENT

Figure 1:
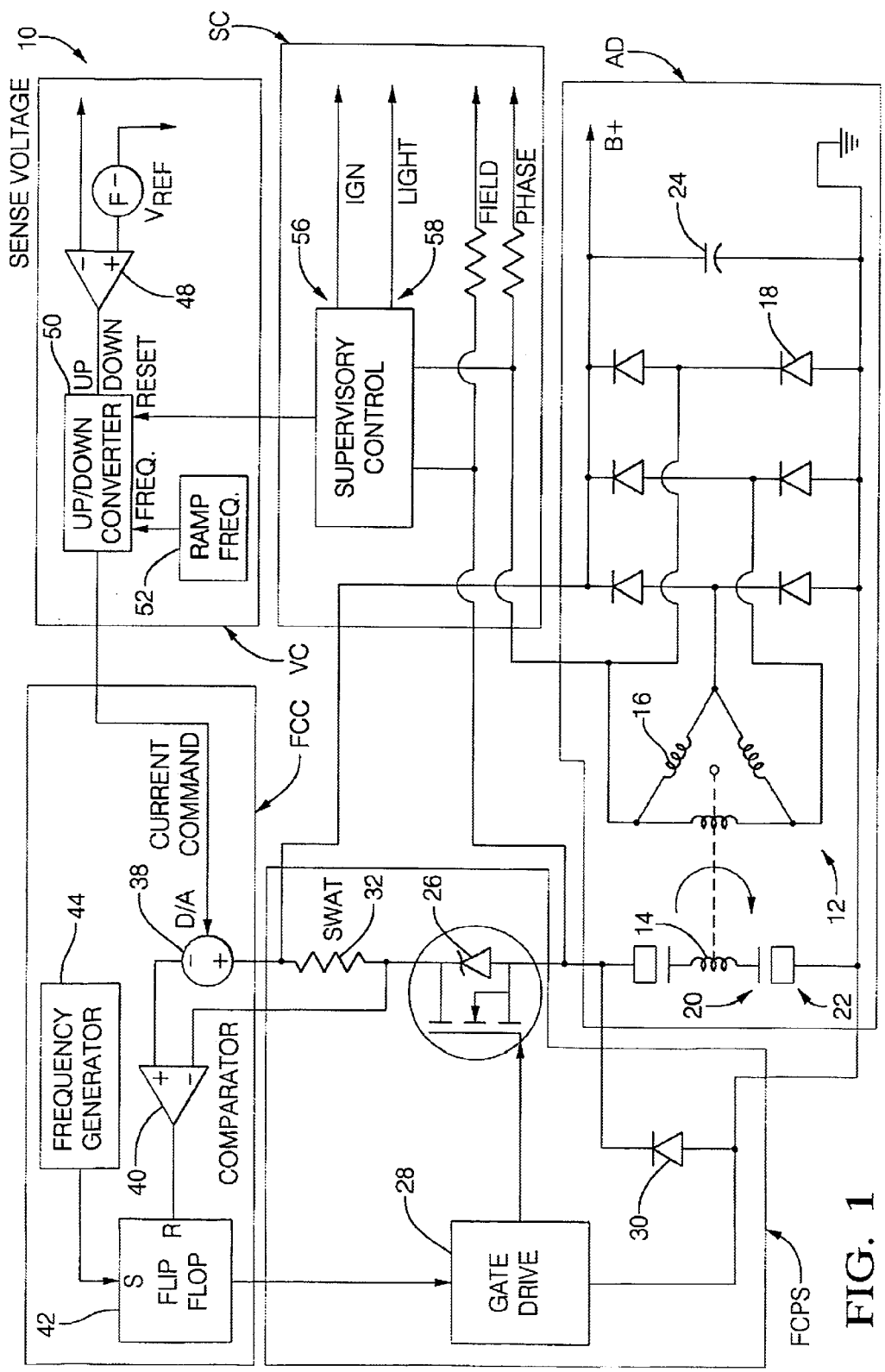
FIG. 1 is a block diagram schematically illustrating a vehicle electrical generator system including a circuit configuration for generator field regulation control constructed in accordance with the present invention.

Referring to FIG. 1 of the drawings, a circuit configuration for an alternating current generator field regulation control is indicated by reference numeral 10 and is used to control the voltage in a vehicle electrical generator system that uses a 3 phase alternator 12 with its associated field coil 14, stator coils 16 and diode bridge or rectifiers 18. As is hereinafter more fully described the electrical generator system includes a number of sub systems generally referred to as an alternator and diode bridge subsystem, a field control power stage subsystem, a field current controller subsystem, a voltage controller subsystem, and a supervisory control subsystem.

With continuing reference to FIG. 1, the alternator 12 and diode bridge 18 subsystem AD convert rotational energy into DC electrical energy. A varying magnetic field is produced by the rotating electromagnet referred to as field coil 14. Coil 14 includes wire wound around a magnetic material (usually iron) and the magnetic flux is directed to the stator 16 through an air gap. Current is delivered to the field coil 14 through a pair of slip rings and brushes 20, 22. The brushes 22 are stationary spring loaded contacts that make connection with the rotating slip rings 20. The slip rings 20 are connected to the field windings and current passes through the brushes 20 into the field. The rotating magnetic field is coupled to the stator 16 which includes multiple windings (3 typically) that are evenly spaced in electrical displacement. (120 electrical degrees for a 3 phase winding). This construction produces alternating voltage and current waveforms that are evenly spaced electrically and provide relatively smooth power output. The alternating current (AC) is converted to direct current (DC) by the diode bridge 18. Current coming out of stator 16 is directed into the positive leg of the bridge 18, and current going into the stator is directed to take it out of the negative leg. Output capacitor 24 is used to smooth out the transients caused by diode switching.

The field control power stage subsystem FCPS includes 3 basic components. A power switch 26, such as a power MosFet, a switch driver 28, a free wheeling or catch diode 30, and a shunt 32. The power switch 26 is used to apply B+ voltage to the field at the command of the controller. B+ is supplied through the shunt 32 in order to give the controller information about field current. The shunt 32 can be external or internal to the switch 26 and the shunt can be a magnetic pickup instead of a resistive element. The switch drive 28 is used to convert logic level signals to signals that the power switch 26 can use to turn on and off. The free wheeling diode 30 allows the current to circulate when the switch 26 turns off. When the switch 26 is turned on, the field current will increase with the traditional single pole R/L response. (A typical time constant is about 100 mS.) When the switch 26 is turned off, the field inductance does not want to change current and will produce a negative voltage which is clamped by the free wheeling diode. When the switch 26 is operated at a fixed on to off ratio or duty cycle, this imposes an average voltage on the field proportional to B+ and the duty cycle. The single pole response of the field will give an average current through the field with a ripple content determined primarily by the frequency of switching and the time constant of the field.

The field current controller subsystem FCC includes the circuit configuration for the alternating current generator field regulation control, takes either a digital or analog current command and gives the power stage the signals on when to turn on and off to regulate the field current. A digital to analog converter (D/A) 38 converts the digital command to an analog voltage that comparator 40 can use. The comparator 40 determines if the current in the power switch 26 feeding the field is greater than a command point and is used to tell flip flop 42 when to turn switch 26 off. A frequency generator 44 is used to periodically tell the flip flop 42 to turn switch 26 on. This results in the turn on event being driven by a fixed frequency, and the turn off event being determined if the actual current exceeds the command set point. The flip flop 42 is edge triggered so that in the event of a fault (short) in the field, high frequency oscillations are not set up as the set and reset signals fight each other. The end result is a fixed frequency switching signal where the max current is the current command.

The voltage controller subsystem VC comprises four basic elements. The purpose of this subsystem is to compare a system voltage (sense voltage) to a reference voltage $V_{Ref}$. The sense voltage is sensed at a point where voltage regulation is desired, usually at the engine cranking motor or at the vehicle battery. A voltage comparator 48 determines if the sensed voltage is higher or lower than the reference voltage $V_{Ref}$. An up/down counter 50 converts the over/under signal from the comparator 48 to a digital current command, and a frequency generator 52 increments the up/down counter. The basic function is to increase the current command by a preset rate when the voltage is under the set point, and to decrease the current when it is over the set point. The rate at which it increases or decreases is determined by the ramp frequency. The ramp frequency is set to give the desired system dynamics, if it is too fast the overall system will oscillate, if it is too slow, excessive over and undershoot will result when a load change occurs.

The supervisory control subsystem SC supervises the overall control of the circuit 10 and provides communication with the system (vehicle). It provides functions of power up and power down, generator disable, fault indication, and some performance indicators. Power up and down are commanded by the system through either the ignition input 56 or the light terminal 58. The ignition terminal is an input only and will power up the generator as soon as it sees voltage. The light terminal 58 is a bidirectional open collector type (or open drain) that will pull low to light the indicator and also senses when voltage is applied to power up the generator. The supervisory control SC will power down the generator when the light and ignition signals are removed and the generator stops rotating. The supervisory control SC senses generator speed through the phase signal. Some supervisors will respond to a set of input conditions (combinations of ignition, light, and other parameters) to disable generator output without turning the circuits off. This is typically done to temporarily remove the generator load from the engine. Setting the up/down counter to 0 does this here. Field and phase signals are isolated with some resistance and presented to the system (vehicle) for use in determining generator speed and load.

Changes in current command are executed as fast as the system will allow. The switch 26 will go full on until the current is met or it will go off until the current decays to the desired value. In addition, it reduces the B+ sensitivity. When the field is current controlled, the current never gets higher than the maximum. Since the turns in the field don't change, it not only makes it more robust to changes in field resistance, but full generator output can be obtained when it would normally shut the generator down due to overcurrent. If the voltage ramp frequency is correctly set, voltage stability is very good with no overshoot. If it is ramped so that the current command is just ahead of the field current response (typically 100 ms time constant), then the field current will go as fast as it can to the level that creates the desired output voltage. Thus the need for overvoltage protection may be eliminated since the field switch is essentially shut off until the voltage gets below the set point.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A circuit configuration for controlling the field current of an alternating current generator adapted for use in a vehicle electrical generator system, the circuit configuration comprising:

a digital to analog converter to convert a digital command signal to an analog voltage;

a first comparator for comparing the system field current with the converted analog voltage;

a switched component operatively connected to a power switch and switchable in response to the comparator output;

a frequency generator operatively connected to the switched component and providing timed pulses to periodically tell the switched component to turn on the power switch;

a second comparator for comparing a sensed voltage, where voltage regulation is required, with a reference voltage;

an up/down counter for converting the over/under signal from the comparator to said digital command signal;

a frequency generator to increment the up/down counter; and a supervisory control circuit operatively connecting said up/down counter, said generator field and phase signals, and an ignition input to power up and power down said generator.

2. The circuit configuration of claim 1 wherein said switched component is a RS flip flop.

3. A method for controlling the field current of an alternating current generator adapted for use in a vehicle electrical generator system, the method comprising:

converting a digital command signal to an analog voltage;

comparing the system field current with the converted analog voltage;

switching off a power switch in response to the comparator output;

generating timed pulses to periodically tell the switched component to turn on the power switch;

comparing a sensed voltage, where voltage regulation is required, with a reference voltage;

converting an over/under signal from the comparator to the digital command signal;

incrementing the digital command signal; and operatively connecting an up/down counter, a generator field and phase signals, and an ignition input to power up and power down said generator.

* * * * *